(12) United States Patent
Suzuki et al.

(10) Patent No.: US 7,580,418 B2
(45) Date of Patent: Aug. 25, 2009

(54) NETWORK, ROUTER DEVICE, ROUTE UPDATING SUPPRESSION METHOD USED FOR THE SAME, AND PROGRAM THEREOF

(75) Inventors: Kazuya Suzuki, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 553 days.

(21) Appl. No.: 10/582,367

(22) PCT Filed: Nov. 19, 2004

(86) PCT No.: PCT/JP2004/017280

§ 371 (c)(1),
(2), (4) Date: Jun. 9, 2006

(87) PCT Pub. No.: WO2005/060186

PCT Pub. Date: Jun. 30, 2005

(65) Prior Publication Data

US 2007/0159975 A1 Jul. 12, 2007

(30) Foreign Application Priority Data

Dec. 17, 2003 (JP) ............................ 2003-418832

(51) Int. Cl.
*H04L 12/56* (2006.01)
(52) U.S. Cl. ...................... 370/401; 370/252; 370/410
(58) Field of Classification Search ................ 370/252, 370/254, 255, 230, 231, 235, 352, 353, 354, 370/355, 356, 400, 401, 408, 410, 428, 429, 370/449, 450
See application file for complete search history.

(56) References Cited

U.S. PATENT DOCUMENTS

| 5,604,735 | A | * | 2/1997 | Levinson et al. | ............ 370/360 |
| 5,687,168 | A | * | 11/1997 | Iwata | .......................... 370/255 |
| 6,452,934 | B1 | * | 9/2002 | Nakata | ........................ 370/428 |

(Continued)

FOREIGN PATENT DOCUMENTS

JP 10-276208 A 10/1998

(Continued)

OTHER PUBLICATIONS

Yasuhiko Matunaga, et al., Adaptive Route Filtering for the Stable Internet Routing, Technical Report of IEICE, SSE97-5, IN97-5 (Apr. 1997).

*Primary Examiner*—Chi H. Pham
*Assistant Examiner*—Kevin Mew
(74) *Attorney, Agent, or Firm*—Sughrue Mion, PLLC

(57) ABSTRACT

A router (1) introduces virtual interfaces (3-1-3-n) between network interfaces (2-1-2-n) and a routing processing unit (4). The virtual interfaces (3-1-3-n) function to conceal a state such as a hit of the network interfaces (2-1-2-n) from the routing processing unit (4). One virtual interface is provided for each of the network interfaces (2-1-2-n). In the virtual interfaces (3-1-3-n), an up state, a down state, and a hit state are prepared as the states which the link takes. In the case of the hit state, the virtual interfaces (3-1-3-n) do not notify the routing processing unit (4) of a change in link state.

25 Claims, 4 Drawing Sheets

U.S. PATENT DOCUMENTS

| | | | |
|---|---|---|---|
| 6,580,715 B1 * | 6/2003 | Bare | 370/396 |
| 6,721,290 B1 * | 4/2004 | Kondylis et al. | 370/329 |
| 6,856,627 B2 * | 2/2005 | Saleh et al. | 370/397 |
| 6,876,625 B1 * | 4/2005 | McAllister et al. | 370/221 |
| 6,963,575 B1 * | 11/2005 | Sistanizadeh et al. | 370/404 |
| 7,164,694 B1 * | 1/2007 | Nodoushani et al. | 370/467 |
| 7,391,741 B2 * | 6/2008 | Kang | 370/254 |
| 2001/0048693 A1 * | 12/2001 | Lee et al. | 370/469 |
| 2002/0004843 A1 | 1/2002 | Andersson et al. | |
| 2002/0018447 A1 | 2/2002 | Yamada et al. | |
| 2002/0169794 A1 * | 11/2002 | Jones et al. | 707/204 |
| 2004/0085972 A1 * | 5/2004 | Warren et al. | 370/401 |
| 2004/0264481 A1 * | 12/2004 | Darling et al. | 370/401 |
| 2005/0125414 A1 * | 6/2005 | Navas et al. | 707/10 |
| 2006/0187856 A1 * | 8/2006 | Booth et al. | 370/254 |
| 2007/0195715 A1 * | 8/2007 | Yamano et al. | 370/254 |

FOREIGN PATENT DOCUMENTS

| | | |
|---|---|---|
| JP | 2000-138874 A | 5/2000 |
| JP | 2000-188608 A | 7/2000 |
| JP | 2002-305540 A | 10/2002 |
| JP | 2003-046551 A | 2/2003 |
| JP | 2003-273910 A | 9/2003 |
| JP | 2004-032366 A | 1/2004 |
| JP | 2004-147021 A | 5/2004 |

* cited by examiner under control of a computer constituting a router device
including a plurality of network interfaces for connection
to an outside, and routing processing means for performing
routing processing for a packet received through the network
interface on the basis of route information stored in advance.
This method comprises the steps of causing virtual interfaces
to manage a change in state of a link for connection to the
outside in accordance with an up state in which connection
continues for not less than a predetermined time, a down
state in which disconnection continues for not less than a
predetermined time, and a hit state in which the connection
and the disconnection repeat.

NETWORK, ROUTER DEVICE, ROUTE UPDATING SUPPRESSION METHOD USED FOR THE SAME, AND PROGRAM THEREOF

This application claims priority from PCT Application No. PCT/JP2004/017280 filed Nov. 19, 2004, and from Japanese Patent Application No. 2003-418832 filed Dec. 17, 2003, which applications are incorporated herein by reference.

TECHNICAL FIELD

The present invention relates to a network, a router device, a route updating suppression method used for the same, and a program thereof and, more particularly, to the updating of route information at the occurrence of a hit in a network.

BACKGROUND ART

Recently, the IP (Internet Protocol) technique has been applied to various networks, and various kinds of problems, which were not conceivable at the creation of the Internet, have begun to occur.

Conventionally, in the Internet, in order to conform to a change in network topology, link information and the like are exchanged by using a routing protocol in each router in the network (see, for example, Japanese Patent Laid-Open Nos. 2003-046551 and 2003-273910).

When a given link breaks down, the routers at the two ends of the link notify each other of the breakdown of the link to allow each router in the network to update the route information, thereby inhibiting the use of the link.

If, however, there is a link which frequently undergoes a change in state, e.g., a wireless link, route information is frequency updated. Since the processing of updating route information is high in load, frequent execution of update processing will influence the performance of the router.

According to the Internet using packet-type communication models, a next transfer destination is determined from the destination in a packet header received by each router in the network, and a packet is transferred to the next transfer destination, thereby realizing end-to-end communication. It is therefore important for each router in the network to have correspondence information (route information) between a destination and the next transfer destination which corresponds to the state of the network at that point of time.

The respective routers in the network exchange reachability information such as the information of a link connected to the routers by using a routing protocol. Each router calculates route information from the reachability information obtained at this point of time, and performs transfer processing for packets by using the calculated route information.

FIG. 4 shows an example of the arrangement of the router. Referring to FIG. 4, a router 7 is connected to an external network (not shown) through the network interfaces 2-1 to 2-n. A routing protocol 5 exchanges reachability information with an adjacent router (not shown) through the network interfaces 2-1 to 2-n.

The routing protocol 5 stores acquired reachability information in an internal database 61 of a route calculation module 6. The route calculation module 6 calculates route information on the basis of the information in the internal database 61, and registers the route information in a route table 41 of a routing processing unit 4.

The routing processing unit 4 searches the route table 41 for a next transfer destination and a transmission interface by using the destination of the header of a packet received through network interfaces 2-1 to 2-n, and outputs a packet from the obtained transmission interface.

If, for example, the topology changes as the link connecting the routers is disconnected or the like, the router 7 notifies another router in the network of new reachability information by using the routing protocol 5.

DISCLOSURE OF INVENTION

Problem to be Solved by the Invention

The above conventional router re-calculates route information upon receiving new reachability information, and hence has the following problems in a situation where the topology repeatedly changes due to link hits and the like. (1) Since the routing protocol frequently causes notification of reachability information, a network band is consumed. (2) Causing each router in the network to repeatedly re-calculate a route will influence the throughput of each router.

As a technique of preventing a network from becoming unstable due to the repetition of a link hit, route dampening is available. In this technique, a penalty is given to a link subjected to repetitive hits, and when the value of penalty exceeds a predetermined value, the notification of link connection is suppressed.

In addition, the value of penalty given to a link on which notification suppression is imposed is gradually decreased in a situation where no link hit is caused. When this value is decreased below a predetermined value, the notification suppression is released. According to this technique, even if a link to which a penalty is given is in a connected state, the link is not notified to other routers in the network until the penalty is released, resulting in a problem in terms of use efficiency.

It is therefore an object of the present invention to provide a network, a router device, a route updating suppression method used for the same, and a program thereof which can solve the above problems, suppress the number of times update processing for route information is performed, and realize stable network operation.

Means of Solution to the Problem

A network according to the present invention includes at least a router device including a plurality of network interfaces for connection to an outside, and routing processing means for performing routing processing for a packet received through the network interface on the basis of route information stored in advance. The router device comprises virtual interfaces which manage a change in state of a link for connection to the outside in accordance with an up state in which connection continues for not less than a predetermined time, a down state in which disconnection continues for not less than a predetermined time, and a hit state in which the connection and the disconnection repeat.

A router device according to the present invention comprises a plurality of network interfaces for connection to an outside, and routing processing means for performing routing processing for a packet received through the network interface on the basis of route information stored in advance. This device comprises virtual interfaces which manage a change in state of a link for connection to the outside in accordance with an up state in which connection continues for not less than a predetermined time, a down state in which disconnection continues for not less than a predetermined time, and a hit state in which the connection and the disconnection repeat.

A route updating suppression method according to the present invention is a route updating suppression method for a network including at least a router device including a plurality of network interfaces for connection to an outside, and routing processing means for performing routing processing for a packet received through the network interface on the basis of route information stored in advance. This method comprises the step of managing a change in state of a link for connection to an outside in accordance with an up state indicating a state in which connection continues for not less than a predetermined time, a down state in which disconnection continues for not less than a predetermined time, and a hit state in which the connection and the disconnection repeat, on the side of virtual interfaces arranged between the network interfaces and the routing processing means so as to respectively correspond to the plurality of network interfaces.

A program for a route updating suppression method according to the present invention is a program for a route updating suppression method for a network including at least a router device including a plurality of network interfaces for connection to an outside, and routing processing means for performing routing processing for a packet received through the network interface on the basis of route information stored in advance. This program is used to execute the step of managing a change in state of a link for connection to an outside in accordance with an up state indicating a state in which connection to the outside continues for not less than a predetermined time, a down state in which disconnection continues for not less than a predetermined time, and a hit state in which the connection and the disconnection repeat, on the side of virtual interfaces arranged between the network interfaces and the routing processing means so as to respectively correspond to the plurality of network interfaces.

Effect of the Invention

The present invention has the following arrangement and performs the following operation to suppress the number of times update processing for route information is performed, thereby obtaining the effect of realizing stable network operation.

BEST MODE FOR CARRYING OUT THE INVENTION

Figure 1:
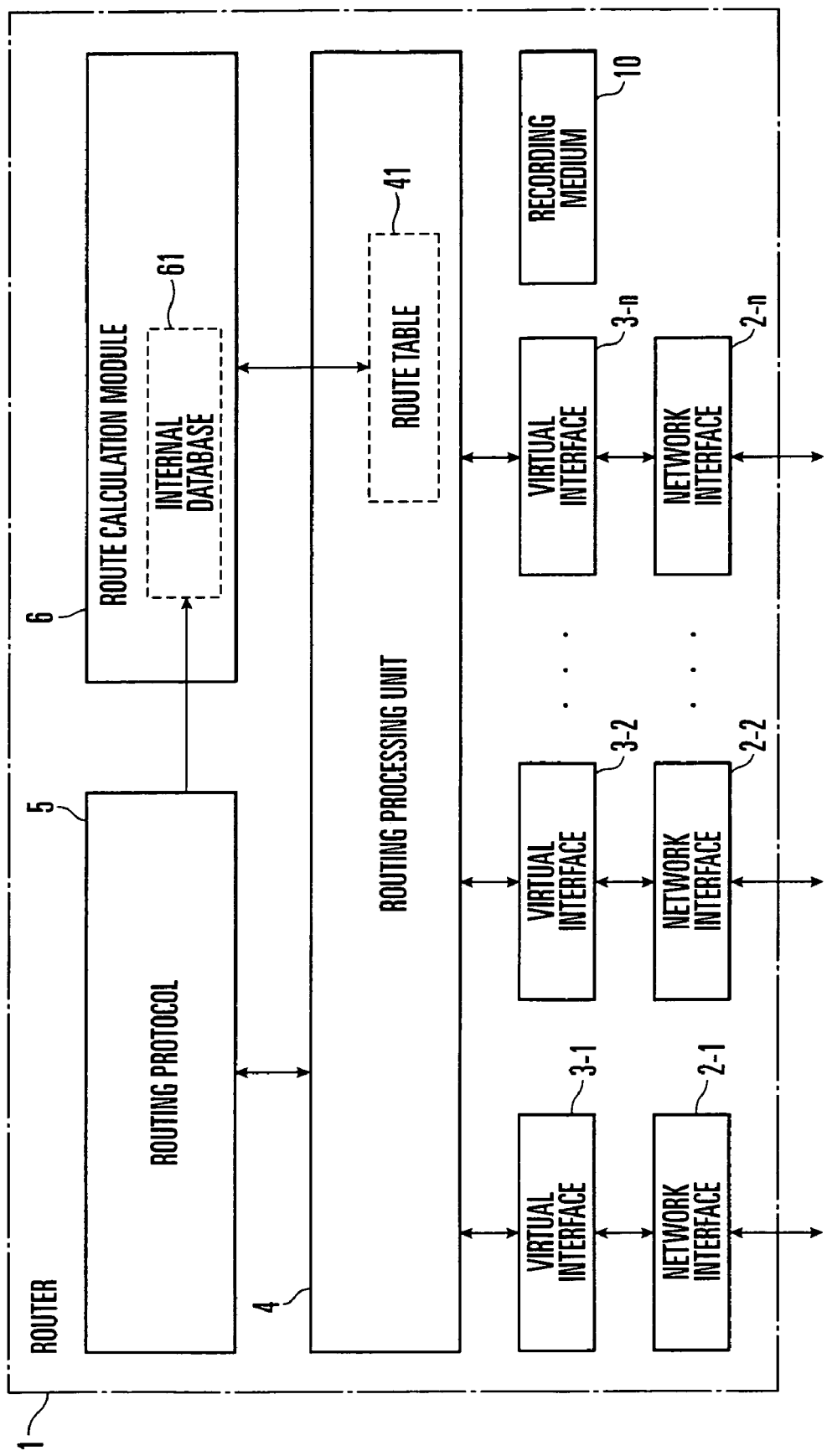
FIG. 1 is a block diagram showing the arrangement of a router device according to an embodiment of the present invention.

An embodiment of the present invention will be described next with reference to the accompanying drawings. Referring to FIG. 1, a router 1 comprises network interfaces 2-1 to 2-n, virtual interfaces 3-1 to 3-n, a routing processing unit 4, a routing protocol 5, a route calculation module 6, and a recording medium 10 which stores programs for implementing processing in the respective units (programs which can be executed by the computer).

The router 1 is connected to an external network (not shown) through the network interfaces 2-1 to 2-n. The routing protocol 5 exchanges reachability information with an adjacent router (not shown) through the network interfaces 2-1 to 2-n.

The routing protocol 5 stores the acquired reachability information in an internal database 61 of the route calculation module 6. The route calculation module 6 calculates route information on the basis of the information in the internal database 61, and registers the route information in a route table 41 of the routing processing unit 4.

The routing processing unit 4 searches the route table 41 for a next transfer destination and a transmission interface by using the destination of the header of a packet received through network interfaces 2-1 to 2-n, and outputs a packet from the obtained transmission interface.

The router 1 is a router designed to transfer IP (Internet Protocol) packets. Note, however, that this router may be designed to transfer IPv6 (Internet Protocol version 6) instead of IP packets. Although the following description is about a case wherein IP packets are handled, IPv6 packets can also be handled by the same arrangement as that of this embodiment.

The router 1 introduces the virtual interfaces 3-1 to 3-n between the network interfaces 2-1 to 2-n and the routing processing unit 4. The virtual interfaces 3-1 to 3-n function to conceal states such as hits of the network interfaces 2-1 to 2-n from the routing processing unit 4, and are respectively prepared for the network interfaces 2-1 to 2-n. Note that the network interfaces 2-1 to 2-n will be referred to as real interfaces to be discriminated from the virtual interfaces 3-1 to 3-n.

Assume that serial numbers are assigned to the real interfaces 2-1 to 2-n, and the same serial numbers as those of the corresponding real interfaces 2-1 to 2-n are assigned to the virtual interfaces 3-1 to 3-n.

In the virtual interfaces 3-1 to 3-n, a hit state is prepared in addition to an up data and a down state with respect to the states which a link takes. In the case of a hit state, the virtual interfaces 3-1 to 3-n do not notify the routing processing unit 4 of a change in link state.

With this operation, even if a link hit repeatedly occurs, since the virtual interfaces 3-1 to 3-n do not notify the routing processing unit 4 of changes in link state, the route information is not updated.

In this case, a hit state is defined as an unstable state wherein the state of the real interfaces 2-1 to 2-n repeatedly becomes an up state and a down state. In this embodiment, with regard to a link in a hit state, no state change is notified by using the routing protocol 5.

Figure 2:
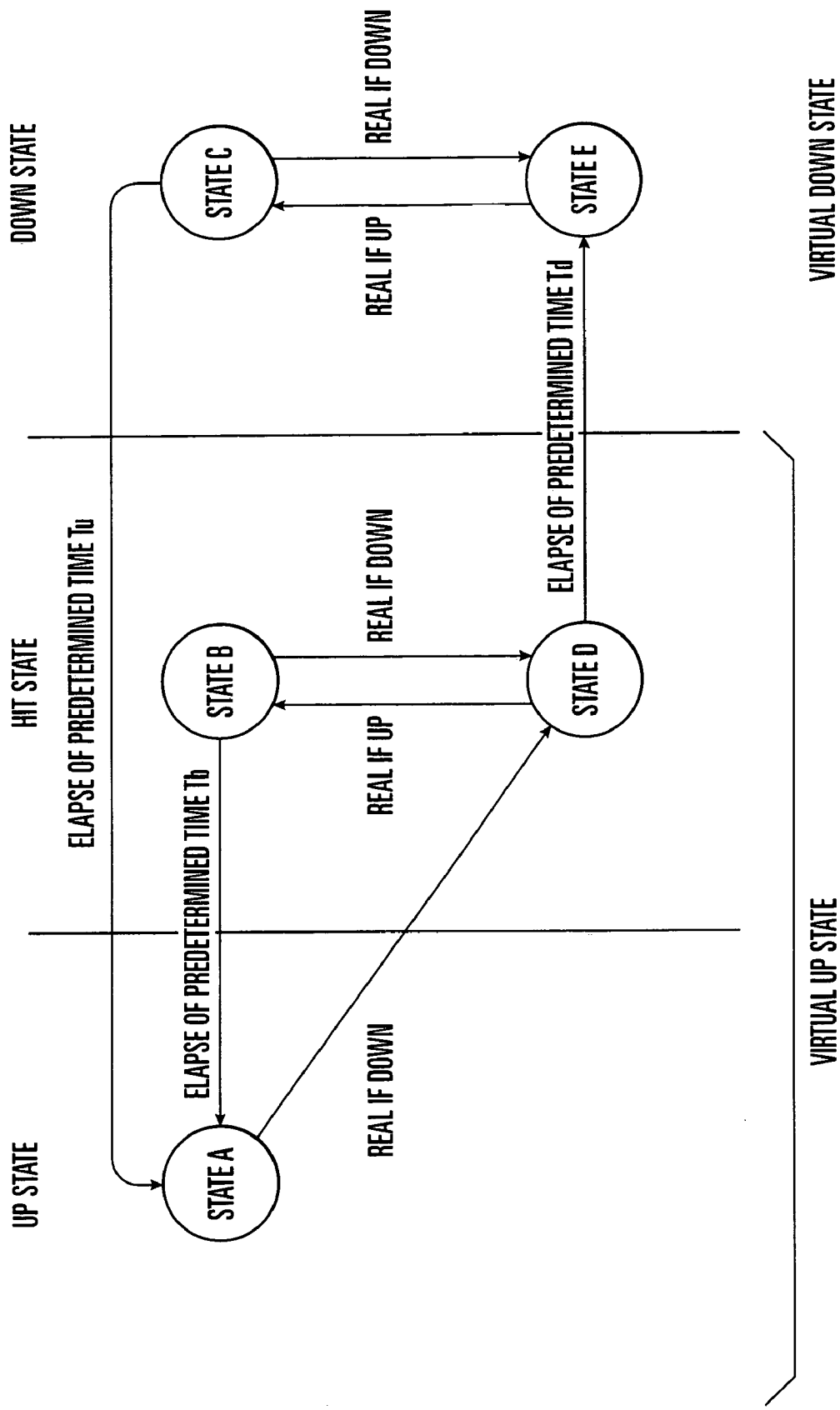
FIG. 2 is a state transition diagram showing changes in link state according to an embodiment of the present invention.

Link state management in the virtual interfaces 3-1 to 3-n according to an embodiment of the present invention will be described with reference to FIG. 2.

In this embodiment, as the states of a link connected to the router 1, five states, i.e., states A to E, are prepared. State A is a state wherein a link is continuously connected for a predetermined time or more. This state is defined as an up state. State D is a state wherein link disconnection occurs in state A. State B is a state wherein a link is connected in state D. When link connection and disconnection repeatedly occur, state transition occurs between state B and state D. In this case, states B and D are defined as hit states.

If a link is in state D for a predetermined time Td or more, the state changes to state E. Likewise, if the link is in state B for a predetermined time Tb or more, the state changes to state A. That is, if the connected or disconnected state of the link continues for a predetermined time or more, it is determined that the hit of the link is terminated.

State C is a state wherein link connection occurs in state E. States C and E are defined as down states. State C changes to state A after a lapse of a predetermined time Tu.

In this embodiment, an up state and a hit state are defined as virtual up states. In these states, it is recognized that a link is up to the routing processing unit 4.

With this operation, in a hit state, route information is not updated by the routing protocol 5, and hence the load on the router 1 or the network (not show) can be suppressed. Note, however, that in this embodiment, the routing processing unit 4 transmits packets to even a link in a hit state.

At this time, packets may not be actually transmitted, and packet losses may occur. The problem of such packet losses can be solved by using a protocol at an upper layer having a retransmission mechanism, e.g., TCP (Transmission Control Protocol).

In addition, in this embodiment, packets are queued in a packet queue prepared for an interface, and packets are transmitted when a link is set in an up state. This makes it possible to minimize packet losses.

A sequence of managing the state of the virtual interfaces 3-1 to 3-n according to an embodiment of the present invention will be described with reference to FIGS. 1 to 3. Note that the processing shown in FIG. 3 is implemented by causing the virtual interfaces 3-1 to 3-n to execute a program in the recording medium 10.

Each of the virtual interfaces 3-1 to 3-n in the router 1 independently manages the internal state. Assume that at the start of processing, the real interfaces 2-1 to 2-n are in an up state in the router 1.

Figure 3:
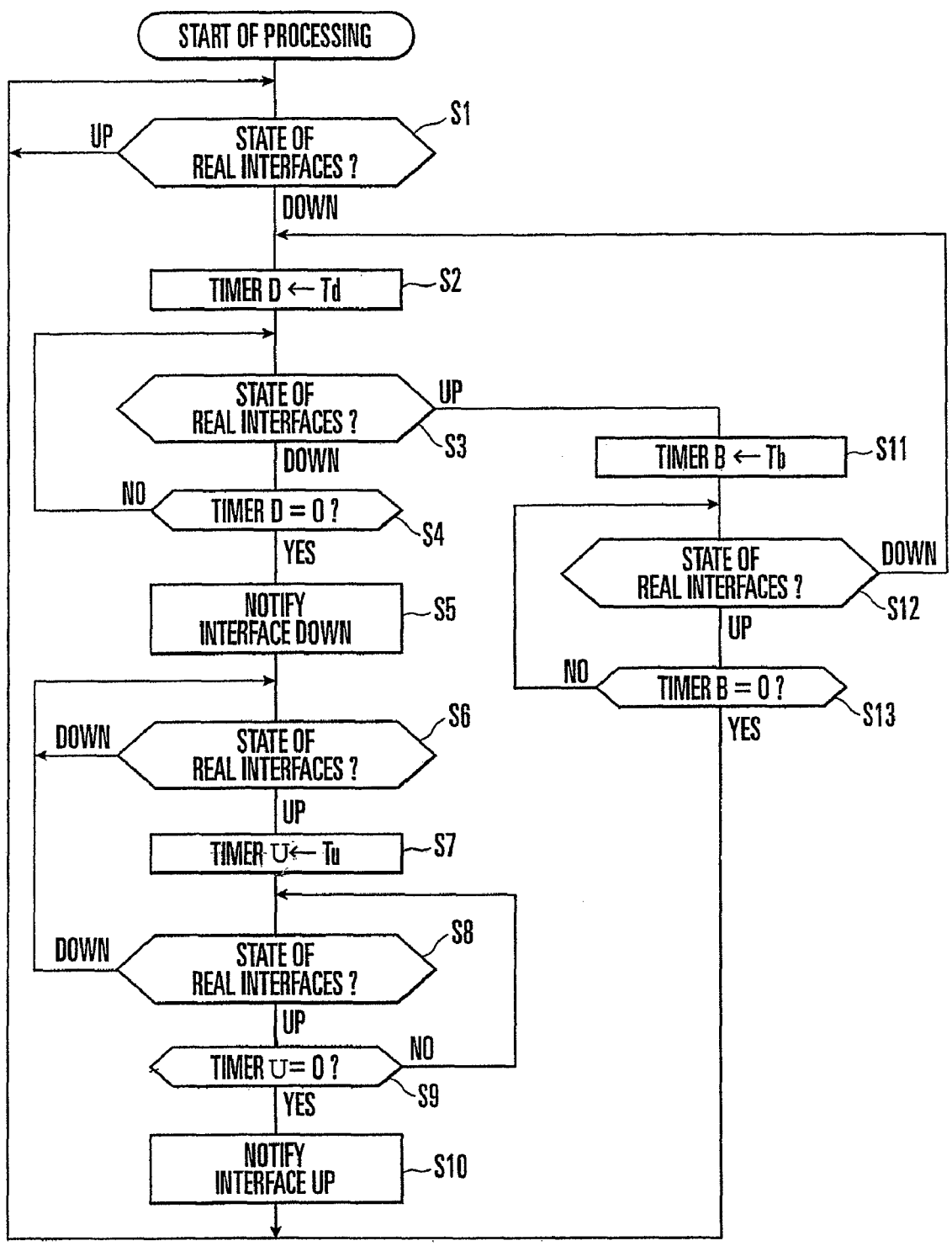
FIG. 3 is a flowchart showing a sequence of managing the state of virtual interfaces according to an embodiment of the present invention.
Figure 4:
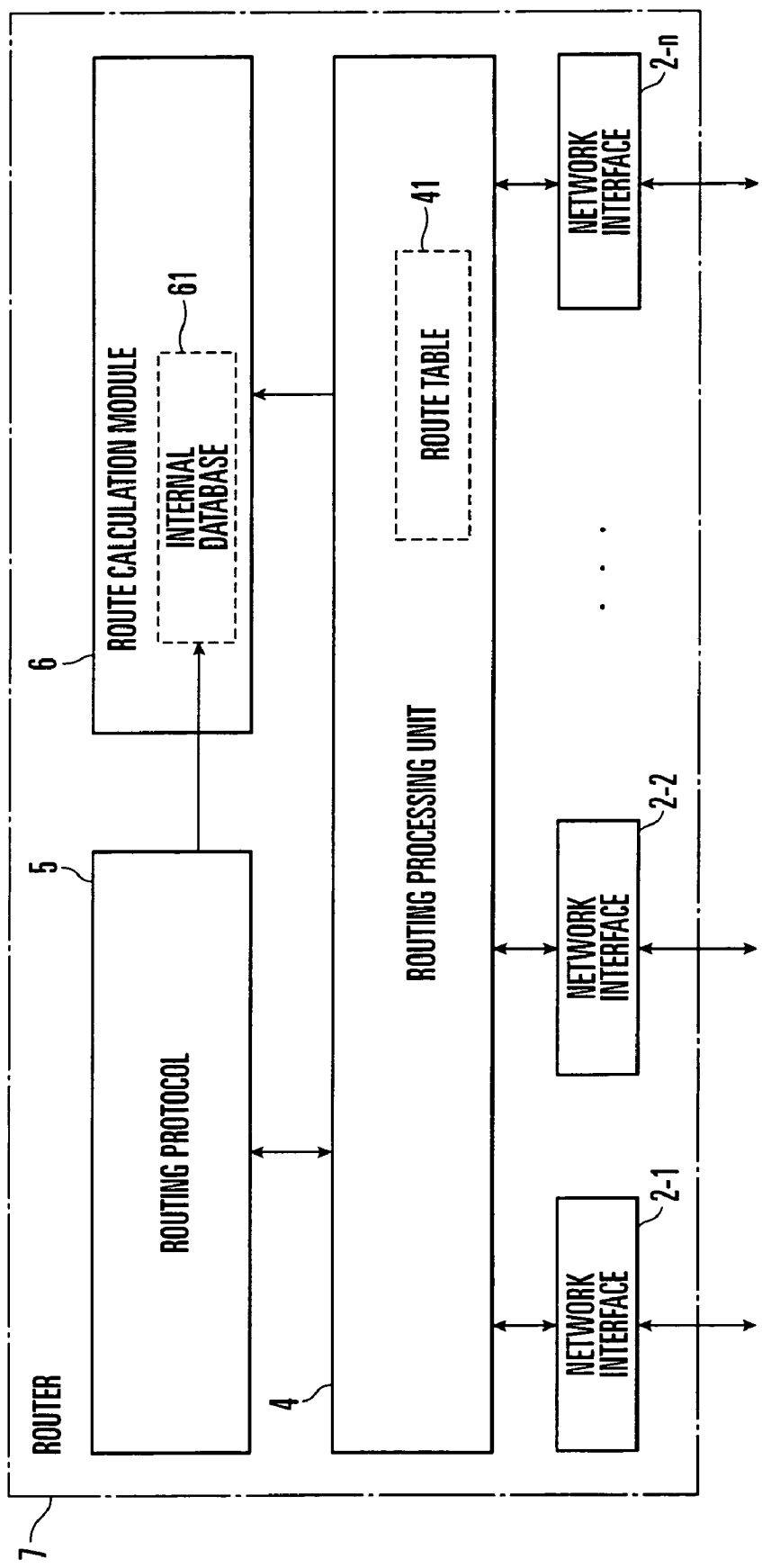
FIG. 4 is a block diagram showing the arrangement of a conventional router device.

First of all, the virtual interfaces 3-1 to 3-n check the state of the real interfaces 2-1 to 2-n (step S1 in FIG. 3). If the real interfaces 2-1 to 2-n are in an up state at this time, the virtual interfaces 3-1 to 3-n repeat the state check processing. The state at this point of time corresponds to state A in FIG. 2.

The virtual interfaces 3-1 to 3-n then set a predetermined value Td in a timer D (not shown) (step S2 in FIG. 3), start to count down the timer D, and check the real interfaces 2-1 to 2-n again (step S3 in FIG. 3).

When the real interfaces 2-1 to 2-n are in a down state, the virtual interfaces 3-1 to 3-n check the timer D (step S4 in FIG. 3). If the value of the timer D is not 0, the flow returns to the check processing for the real interfaces 2-1 to 2-n in step S3 described above. The state at this point of time corresponds to state D in FIG. 2.

When the real interfaces 2-1 to 2-n are in an up state, the virtual interfaces 3-1 to 3-n set a predetermined value Tb in a timer B (not shown) (step S11 in FIG. 3), start to count down the timer, and check the real interfaces 2-1 to 2-n (step S12 in FIG. 3).

If the real interfaces 2-1 to 2-n are in a down state, the virtual interfaces 3-1 to 3-n return to the processing of setting the value Td in the timer D. If the real interfaces 2-1 to 2-n are in an up state, the virtual interfaces 3-1 to 3-n check the timer B (step S13 in FIG. 3). If the value of the timer B is not 0, the virtual interfaces 3-1 to 3-n return to the check processing for the real interfaces 2-1 to 2-n in step S12 described above. The state at this point of time corresponds to state B in FIG. 2. If the timer B is 0, the virtual interfaces 3-1 to 3-n return to the check processing for the real interfaces 2-1 to 2-n in step S1 described above.

If the timer D becomes 0, the virtual interfaces 3-1 to 3-n notify the routing processing unit 4 of interface down (step S5 in FIG. 3), and check the state of the real interfaces 2-1 to 2-n (step S6 in FIG. 3). If the real interfaces 2-1 to 2-n are in a down state at this point of time, the virtual interfaces 3-1 to 3-n repeat the state check processing for the real interfaces 2-1 to 2-n in step S6 described above. The state at this point of time corresponds to state E in FIG. 2.

When the real interfaces 2-1 to 2-n are set in an up state, the virtual interfaces 3-1 to 3-n set a predetermined value Tu in a timer U (not shown) (step S7 in FIG. 3), start to count down the timer, and check the state of the real interfaces 2-1 to 2-n (step S8 in FIG. 3). If the real interfaces 2-1 to 2-n are in a down state, the virtual interfaces 3-1 to 3-n return to the state check processing for the real interfaces 2-1 to 2-n in step S6 described above.

When the real interfaces 2-1 to 2-n are in an up state, the virtual interfaces 3-1 to 3-n check the value of the timer U (step S9 in FIG. 3). If the value of the timer U is not 0, the flow returns to the state check processing for the real interfaces 2-1 to 2-n in step S8 described above. The state at this point of time corresponds to state C in FIG. 2.

When the value of the timer U becomes 0, the virtual interfaces 3-1 to 3-n notify the routing processing unit 4 of interface up (step S10 in FIG. 3), and return to the state check processing for the real interfaces 2-1 to 2-n in step S1 described above.

As described above, in this embodiment, an unstable state wherein the real interfaces 2-1 to 2-n are repeatedly set in an up state and a down state is defined as a hit state. With regard to a link in a hit state, state changes are not notified by using the routing protocol 5, thereby suppressing the number of times update processing for route information is performed in another router in the network. This makes it possible to realize stable network operation.

That is, the network of the present invention can suppress the processing loads on routers by suppressing route information updating operation accompanying link hits in router devices constituting a network using links frequently undergo hits such as wireless links.

In general, as link states, two states, i.e., an up data and a down state, exist. In the network of the present invention, however, management is performed by using three states including a hit state in addition to the above two states.

In the network of the present invention, a state wherein link connection continues for a predetermined time or more is defined as an up state. A state wherein link disconnection continues for a predetermined time or more is defined as a down state. A state wherein link connection and disconnection repeat is defined as a hit state.

The router device of the present invention does not notify another router device of state changes when a link is in a hit state. With this operation, according to the router device of the present invention, since no state changes are notified, route information is not updated. This can therefore suppress the processing loads on router devices in the network.

When a link is in a hit state, since route information is not updated, the router may transmit packets to the link. The reachability of a packet passing through the link in the hit state is maintained by using a means different from updating route information, e.g., using TCP (Transmission Control Protocol) having a retransmission function as a protocol at an upper layer.

The router device of the present invention introduces virtual interfaces between network interfaces and a routing processing unit to conceal the states of the network interfaces from the routing processing unit. In the virtual interfaces, a hit state is prepared in addition to an up data and a down state with respect to the states which a link takes. In a hit state, the virtual interfaces do not notify the routing processing unit of link state changes. With this operation, even if a link hit repeatedly occurs, no link state change is notified to the routing processing unit. Therefore, the updating of route information is not performed.

As has been described above, in the network of the present invention, an unstable state wherein the real interfaces are repeatedly set in an up state and a down state is defined as a hit state. With regard to a link in a hit state, state changes are not notified by using the routing protocol, thereby suppressing the number of times update processing for route information is performed in another router in the network. This makes it possible to realize stable network operation.

The invention claimed is:

1. A network including at least a router device, wherein the router device comprises:
   a plurality of network interfaces for connection to an outside, and
   routing processing means for performing routing processing for a packet received through at least one of said network interfaces on the basis of route information stored in advance,
   a plurality of virtual interfaces which manage a change in a link state of at least one of said network interfaces, wherein said link state is one of an up state in which there is a continuous connection for not less than a first predetermined time, a down state in which there is a continuous disconnection for not less than a second predetermined time, and a hit state in which a connection and a disconnection repeatedly occur while remaining in the hit state.

2. A network according to claim 1, wherein said virtual interfaces are arranged between said network interfaces and said routing processing means so as to respectively correspond to said plurality of network interfaces, and wherein at least one of said virtual interfaces conceals a state of at least one of said network interfaces from said routing processing means.

3. A network according to claim 1, wherein at least one of said virtual interfaces suppress updating of the route information when the link is in the hit state.

4. A network according to claim 1, wherein at least one of said virtual interfaces suppress notification of a change in the state of the link to another router device when the link is in the hit state.

5. A router device comprising
   a plurality of network interfaces for connection to an outside, and
   routing processing means for performing routing processing for a packet received through at least one of said network interfaces on the basis of route information stored in advance
   a plurality of virtual interfaces which manage a change in a link state of at least one of said network interfaces, wherein said link state is one of an up state in which there is a continuous connection for not less than a first predetermined time, a down state in which there is a continuous disconnection for not less than a second predetermined time, and a hit state in which a connection and a disconnection repeatedly occur while remaining in the hit state.

6. A router device according to claim 5, wherein said virtual interfaces are arranged between said network interfaces and said routing processing means so as to respectively correspond to said plurality of network interfaces, and wherein at least one of said virtual interfaces conceals a state of at least one of said network interfaces from said routing processing means.

7. A router device according to claim 5, wherein at least one of said virtual interfaces suppress updating of the route information when the link is in the hit state.

8. A router device according to claim 5, wherein at least one of said virtual interfaces suppress notification of a change in the state of the link to another device when the link is in the hit state.

9. A route updating suppression method for a network comprising of at least a router device wherein the router device comprises: a plurality of network interfaces for connection to an outside, and routing processing means for performing routing processing for a packet received through at least one of said plurality of network interface on the basis of route information stored in advance, the method comprising:
   the step of recognizing at the router device any one of an up state in which there is a continuous connection for not less than a first predetermined time, a down state in which there is a continuous disconnection for not less than a second predetermined time, and a hit state in which a connection and a disconnection repeatedly occur while remaining in the hit state, on the side of a plurality of virtual interfaces arranged between said network interfaces and the routing processing means so as to respectively correspond to the plurality of network interfaces; and
   the step of managing a change in state of a link for connection to the outside in accordance with a recognition result.

10. A route updating suppression method according to claim 9, further comprising a step of causing at least one of said virtual interfaces to conceal a state of at least one of said network interfaces from the routing processing means.

11. A route updating suppression method according to claim 9, further comprising a step of causing at least one of said virtual interfaces to suppress updating of the route information when the link is in the hit state.

12. A route updating suppression method according to claim 9, further comprising the step of causing at least one of said virtual interfaces to suppress notification of a change in state of the link to another router device when the link is in the hit state.

13. A computer recording medium having a computer program encoded therein for a route updating suppression method for a network including at least a router device including a plurality of network interfaces for connection to an outside, and routing processing means for performing routing processing for a packet received through at least one of said network interfaces on the basis of route information stored in advance, said program comprising:
   the step of recognizing any one of an up state in which there is a continuous connection for not less than a first predetermined time, a down state in which there is a continuous disconnection for not less than a second predetermined time, and a hit state in which a connection and a disconnection repeatedly occur while remaining in the hit state, on the side of a plurality of virtual interfaces arranged between the said network interfaces and the routing processing means so as to respectively correspond to the plurality of network interfaces; and
   the step of managing a change in state of a link for connection to the outside in accordance with a recognition result.

14. The network of claim 1, wherein the state of a link remains in the hit state until a connection or disconnection occurs for at least said first predetermined time or said second predetermined time respectively.

15. The network of claim 1, wherein the router device notifies another routing device that it is in the hit state.

16. The network of claim 1, wherein at least one of said virtual interfaces notifies a change in the state of a link of at least one of said network interfaces to said routing processing means if either the up state or the down state occur.

17. The router device of claim 5, wherein the state of a link remains in the hit state until a connection or disconnection occurs for at least said first predetermined time or said second predetermined time respectively.

18. The router device of claim 5, wherein the router device notifies another routing device that it is in the hit state.

19. The router device of claim 5, wherein at least one of said virtual interfaces notifies a change in the state of a link of at least on of said network interfaces to said routing processing means if either the up state or the down state occur.

20. The route updating suppression method of claim 9, wherein the state of a link remains in the hit state until a connection or disconnection occurs for at least said first predetermined time or said second predetermined time respectively.

21. The route updating suppression method of claim 9, wherein the router device notifies another routing device that it is in the hit state.

22. The route updating suppression method of claim 9, wherein at least one of said virtual interfaces notifies a change in the state of a link of at least one of said network interfaces to said routing processing means if either the up state or the down state occur.

23. The computer recording medium of claim 13, wherein the program further comprises a step of maintaining the state of a link in the hit state until a connection or disconnection occurs for at least a first predetermined time or a second predetermined time respectively.

24. The computer recording medium of claim 13, wherein the program further comprises a step of notifying another routing device that it is in the hit state.

25. The computer recording medium of claim 13 wherein the program further comprises a step of notifying a change in the state of a link of atleast one of said network interfaces to said routing processing means if either the up state or the down state occur.

* * * * *